United States Patent
Hobbs et al.

(10) Patent No.: US 6,682,585 B2
(45) Date of Patent: Jan. 27, 2004

(54) REFINING NONFERROUS METALS AND ALLOYS WITH GASES HAVING REDUCED GLOBAL WARMING POTENTIAL

(75) Inventors: John Peter Hobbs, Lansdale, PA (US); James Francis Heffron, Orwigsburg, PA (US); Zbigniew Zurecki, Macungie, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 10/050,331

(22) Filed: Jan. 16, 2002

(65) Prior Publication Data

US 2002/0166413 A1 Nov. 14, 2002

Related U.S. Application Data

(63) Continuation-in-part of application No. 09/781,099, filed on Feb. 9, 2001, now Pat. No. 6,521,018, which is a continuation-in-part of application No. 09/499,593, filed on Feb. 7, 2000, now Pat. No. 6,398,844.

(51) Int. Cl.$^7$ ................................................. C22B 9/05
(52) U.S. Cl. ............................ 75/585; 75/414; 420/590
(58) Field of Search .................... 75/585, 414; 420/590

(56) References Cited

U.S. PATENT DOCUMENTS

| | | | |
|---|---|---|---|
| 3,434,825 A | 3/1969 | Dore et al. ................ 75/76 |
| 3,743,263 A | 7/1973 | Szekely .................... 266/34 A |
| 3,839,019 A | 10/1974 | Bruno et al. .............. 75/68 R |
| 3,854,934 A | 12/1974 | Dore et al. ................ 75/68 R |
| 3,958,981 A | 5/1976 | Forberg et al. ............ 75/68 R |
| 4,010,030 A | 3/1977 | French .................... 75/76 |
| 4,047,938 A | 9/1977 | Szekely ................... 75/67 A |
| 4,350,524 A | 9/1982 | Knoepke et al. ........... 75/63 |
| 4,392,888 A | 7/1983 | Eckert et al. ............. 75/68 R |
| 4,959,101 A | 9/1990 | MacNeal et al. ........... 75/685 |
| 4,992,241 A | 2/1991 | Provencher et al. ........ 420/528 |
| 5,145,514 A | 9/1992 | Gariepy et al. ........... 75/681 |
| 5,632,295 A | * 5/1997 | Sm.ang.rs ................. 137/3 |
| 5,839,285 A | * 11/1998 | Kniebes .................. 62/48.1 |
| 5,855,647 A | * 1/1999 | Li et al. ................. 423/155 |

FOREIGN PATENT DOCUMENTS

| | | | | |
|---|---|---|---|---|
| EP | 1013738 A1 | * 6/2000 | ............ | C09K/5/04 |
| EP | 1122322 | 8/2001 | | |
| JP | 61011142 A | * 1/1986 | ............ | B01J/19/14 |
| RU | 2176782 C2 | * 12/2001 | ............ | G01F/11/00 |

OTHER PUBLICATIONS

Elementary Principles of Chemical Processes, 2nd Edition, Felder and Rousseau, Section 4.5 pp. 113–118, Wiley 1986.*
"SF6 Gas Handling Procedure"; http://www.epa.gov/highgwpI/sf6/pdf/sf6utility5.pdf.*
AGA Material Safety Data Sheet http://www.uslindegas.com/web/web2000/us/msds.nsf/NotesMSDS/Aga+Mix+14–Argon+098/$file/Msds_098.*
NIST Website for sulfur hexafluoride, formula, molecular weight, etc., 2 pages. Not date.*
Knovel Website for CRC Handbook of Chemistry of Physics (3rd Electronic Edition) for carbon monoxide, argon, and nitrogen, 5 pages, Copyright 2002.*
Von Gerhard Schemm. "Sulphur Hexafluoride as Protection Against Oxidation of Magnesium Melts." Giesserei (1971) 58(19), pp. 558–565.*
"Recommended Practices for the Conservation of Sulfur Hexafluoride in Magnesium Melting Operations," International Magnesium Association. (1998) as a "Technical Committee Report."*
Search Report dated May 20, 2003.

* cited by examiner

*Primary Examiner*—Roy King
*Assistant Examiner*—Andrew Wessman
(74) *Attorney, Agent, or Firm*—Geoffrey L. Chase

(57) ABSTRACT

An improved method of processing both primary and secondary nonferrous metal and alloys of said metals using a refining gas is provided. The improvement involves refining said non-ferrous metal and alloys with a gaseous mixture including at least one compound selected from the group consisting of $ClF_3$, $ClF$, $COF_2$, $F_3COF$, $CF_2(OF)_2$, $SO_2F_2$, $NF_3$, $SO_2ClF$, $SOF_2$, $SOF_4$, $NOF$, $F_2$ and $SF_4$.

10 Claims, No Drawings

REFINING NONFERROUS METALS AND ALLOYS WITH GASES HAVING REDUCED GLOBAL WARMING POTENTIAL

CROSS-REFERENCE TO RELATED APPLICATIONS

This application is a continuation-in-part of U.S. patent application Ser. No. 09/781,099, filed Feb. 9, 2001, now U.S. Pat. No. 6,521,018 which is a continuation-in-part of U.S. patent application Ser. No. 09/499,593, now U.S. Pat. No. 6,398,844, filed Feb. 7, 2000.

BACKGROUND OF THE INVENTION

The present invention pertains to the refining of metals and alloys with gaseous mixtures, and in particular to a method of refining primary and secondary nonferrous metals and alloys using gases having reduced global warming potentials relative to the prior art.

Prior to casting, a molten metal (pure metal or an alloy) usually contains many impurities, such as dissolved gases, refractory particles, tramp elements and suspended non-metallic particles (e.g., metal oxides). If not removed, these impurities cause high scrap loss in casting, or otherwise cause poor metal quality in products fabricated therefrom.

A variety of refining methods and processes have been developed to remove such impurities from molten metal. Generally, these methods and processes comprise contacting the molten metal with a refining gas. Commonly used refining gases include inert gases (e.g., nitrogen, argon, and mixtures thereof), reactive gases such as sulfur hexafluoride ($SF_6$), halocarbon gases, and chlorine ($Cl_2$), and mixtures thereof. The methods and processes discussed below are representative of the prior art.

U.S. Pat. No. 3,839,019 (Bruno, et al.) discloses a process for removing dissolved hydrogen and aluminum oxide particles from molten aluminum, while purifying the metal of alkali, and alkaline earth elements, such as sodium and calcium, by using a gas mixture of chlorine and argon. The process also is useful in reducing the magnesium content in an aluminum alloy when so desired.

U.S. Pat. No. 3,854,934 (Dore, et al.) discloses a similar process for treating aluminum melts that overcomes the difficulty of separating the liquid chloride salts that form when using chlorine. In this process, a halocarbon gas, such as dichlorodifluoro-methane ($CCl_2F_2$), is introduced as a reactive gas beneath a supernatant salt cover to remove the impurities, the resultant complexes of chloride and fluoride salts being more readily separated from the melt. Unfortunately, the carbon present in the reactive gas molecule combines with the aluminum to form aluminum carbide inclusions in the melt. In practice, the halocarbon may also only partially decompose to form tetrafluoro-methane ($CF_4$), which unbeneficially consumes fluorine value.

U.S. Pat. No. 4,392,888 (Eckert, et al.) discloses a process that overcomes this carbide formation problem by exposing the halocarbon to a controlled amount of an oxidizer, such as oxygen. The carbon is preferentially oxidized to carbon monoxide rather than carbon dioxide, as the latter will react with the aluminum to form aluminum oxides. This process can be further improved by also introducing a fluorine acceptor, such as silicon tetrachloride to minimize the formation of $CF_4$.

While the above processes allow the metal to be successfully refined, the use of halocarbon gases is less acceptable from an environmental perspective. The chlorofluorocarbons (CFC's), like dichlorodifluoromethane ($CCl_2F_2$) or CFC-12, and the hydrochlorofluorocarbons (HCFC's), like monochlorodifluoromethane ($CHF_2Cl$) or HCFC-22, are recognized stratospheric ozone depleting substances and their manufacture and use has been regulated or banned by the EPA under the Clean Air Act in compliance with the Montreal Protocol on ozone depletion. The perfluorocarbons (PFC's), like tetrafluoromethane ($CF_4$), and the hydrofluorocarbons (HFC's), like tetrafluoroethane ($CH_2FCF_3$) or HFC-134a, generally are recognized as global warming compounds. The EPA similarly restricts their use with a scheduled complete phase out in production.

U.S. Pat. No. 5,145,514 (Gariepy, et al.) discloses a process for removing dissolved alkali metals, alkaline earth metals and hydrogen from molten aluminum-magnesium alloys. The critical aspect of this invention is that fluxing with chlorine is carried out by admixing a fluorine gas of sulfur hexafluoride or silicon tetrafluoride with the chlorine so as to prevent the formation of a brittle and non-protective oxide crust on the surface of the molten alloy.

U.S. Pat. No. 4,350,524 (Knoepke, et al.) discloses a method of refining crude silver to remove base metal impurities (e.g., bismuth, lead, antimony, tin, etc.) by treatment with sulfur hexafluoride gas. The crude silver is melted and maintained at about 1,000 C. while it is treated concurrently with sulfur hexafluoride and an oxidizing gas, such as air. (The $SF_6$ and oxidizing gas are bubbled through the molten silver.) Base metal fluorides are formed and are removed from the silver, after which the molten bath is treated with a reducing agent, such as hydrogen gas, propane, or calcium metal.

U.S. Pat. No. 3,434,825 (Dore, et al.) discloses a process for removing both metallic and gaseous impurities from copper base alloys by bubbling a gaseous monomeric, halogen containing, lower aliphatic hydrocarbon containing at least one fluorine atom, such as dichlorodifluoromethane ($CCl_2F_2$), through the copper. The reactive gas is used either pure or as a mixture diluted in an inert.

U.S. Pat. No. 4,010,030 (French) discloses a process for removing metal impurities from molten copper. Bismuth, antimony and arsenic impurities are removed from molten copper by contacting the molten copper with sulfur hexafluoride gas, which reacts directly with the impurities to form gaseous fluorides. An oxygen-containing gas (e.g., air, a mixture of air and oxygen, and/or a mixture of oxygen and an inert gas, such as nitrogen) may be blown through the molten copper simultaneously with or after the $SF_6$ treatment to remove any sulfur contamination from the $SF_6$ treatment.

U.S. Pat. Nos. 3,743,263 (Szekely) and 4,047,938 (Szekely) disclose a process for refining molten metals from the group consisting of magnesium, copper, zinc, tin and lead. The refining gas is argon, nitrogen, or a mixture of argon and nitrogen, all of which are inert towards the molten metal being refined. Hydrogen and carbon monoxide may be used in instances where these gases will not react with the molten metal, but will react with gaseous impurities such as oxygen. Other reactive gases with similar characteristics also can be used, such as sulfur hexafluoride ($SF_6$), chlorine ($Cl_2$), and halogenated hydrocarbons. Selection of a particular refining gas is generally made in accordance with the characteristics of the particular metal being refined.

U.S. Pat. No. 4,992,241 (Provencher, et al.) discloses a process for reprocessing aluminum matrix composites. The process includes treating molten aluminum with a combination of a nonreactive gas and a reactive gas. The reactive gas can be $Cl_2$, $SF_6$ or a mixture thereof. The reactive gas comprises between 2% and 20% by volume of the treatment gas. The patent discloses treatment gas flow rates in the range of 2–6 l/min. for a 300 kg melt.

U.S. Pat. No. 4,959,101 (MacNeal, et al.) discloses a process for degassing aluminum melts without substantially altering the magnesium content of the melt. The process comprises contacting the melt with a mixture of an inert gas (e.g., nitrogen or argon) and a halogenated sulfur compound, such as sulfur hexafluoride ($SF_6$). The sulfur compound is present in the inert gas in an amount between 2% and 20%. The amount of the treatment gas used is disclosed to be about 35 cubic feet per ton of aluminum at a pressure of about 30–45 psig.

Many of the prior art methods and processes use a halocarbon or $SF_6$ as a reactive gas. The use of the reactive gas in a pure form was generally discarded because at the metal melt temperatures the decomposition products cause severe attack on ferrous equipment and non-metallic inclusions. In addition, the use of pure $SF_6$ with molten metals such as magnesium has been reported to have caused explosions. Although sulfur hexafluoride ($SF_6$) and many of the halocarbons are considered physiologically inert, these act as simple asphyxiants which displace oxygen from the breathing atmosphere.

The use of these gases also has some drawbacks. The primary drawback is the release to the atmosphere of material having a high global warming potential (GWP) or an ozone depleting potential.

$SF_6$ has a 100-year global warming potential ($GWP_{100}$) of 23,900 relative to $CO_2$. International concern over global warming has focused attention on the long atmospheric life of $SF_6$ (about 3,200 years, compared to 50–200 years for $CO_2$) together with its high potency as a greenhouse gas (23,900 times the $GWP_{100}$ of $CO_2$ on a mole basis) and has resulted in a call for voluntary reductions in emissions. Because of this concern, the use of $SF_6$ is being restricted and it is expected to be banned in the near future. In addition, $SF_6$ is a relatively expensive gas as compared to chlorine and some halocarbon gases.

It is desired to have a process for refining nonferrous metals and alloys which overcomes the difficulties and disadvantages of the prior art to provide better and more advantageous results.

It is further desired to have an improved method of processing nonferrous metals and alloys using refining gases having no or negligible ozone depleting potential and lower global warming potentials than the gases used in prior art methods.

It also is desired to have an improved method of processing nonferrous metals and alloys using refining gases which overcomes the difficulties and disadvantages of the prior art to provide better and more advantageous results.

BRIEF SUMMARY OF THE INVENTION

A first embodiment of the present invention is an improvement in a method for processing a nonferrous metal and alloys of the metal using a refining gas having a global warming potential. The improvement comprises reducing the global warming potential of the refining gas by refining the nonferrous metal and alloys with a gaseous mixture including at least one compound selected from the group consisting of $ClF_3$, $ClF$, $COF_2$, $F_3COF$, $CF_2(OF)_2$, $SO_2F_2$, $SOF_2$, $SOF_4$, $NF_3$, $SO_2ClF$, $NOF$, $F_2$ and $SF_4$.

There are several variations of the first embodiment of the improvement in the method. In one variation, the at least one compound is provided at a first concentration of less than about 10% on a mole basis of said gaseous mixture. In addition, there are several variants of that variation. In one variant, the first concentration is less than about 6%. In another variant, the first concentration is less than about 1%.

In yet another variant, the gaseous mixture further comprises at least one member selected from the group consisting of He, Ne, Xe, Kr, $Cl_2$, $N_2$, Ar, CO, $CO_2$, $SO_2$, $O_2$, and air. In a variant of that variant, the at least one member is provided at a second concentration of about 30% to about 60% on a mole basis. In a variant of that variant, the at least one compound is $SO_2F_2$ provided at the first concentration of less than about 3% on a mole basis.

In another variation of the first embodiment of the improvement in the method, the gaseous mixture used in the method further comprises an odorant. In yet another variation, at least a portion of the gaseous mixture is recovered for reuse.

The present invention also includes an improvement in a method for processing a melt comprising at least one molten nonferrous metal using a refining gas having a global warming potential. The improvement comprises reducing the global warming potential of the refining gas by refining the melt with a gaseous mixture including at least one compound selected from the group consisting of $ClF_3$, $ClF$, $COF_2$, $F_3COF$, $CF_2(OF)_2$, $SO_2F_2$, $SOF_2$, $SOF_4$, $NF_3$, $SO_2ClF$, $NOF$, $F_2$ and $SF_4$.

The present invention also includes a method for removing impurities from an ingot of a nonferrous metal and alloys of the metal. The method comprises heating the ingot in a presence of an atmosphere containing an effective amount of at least one compound selected from a group consisting of $ClF_3$, $ClF$, $COF_2$, $F_3COF$, $CF_2(OF)_2$, $SO_2F_2$, $SOF_2$, $SOF_4$, $NF_3$, $SO_2ClF$, $NOF$, $F_2$ and $SF_4$.

The present invention also includes a process for treating a nonferrous metal and alloys of the metal.

A first embodiment of the process includes refining the nonferrous metal and alloys with an atmosphere containing an effective amount of at least one compound selected from the group consisting of $ClF_3$, $ClF$, $COF_2$, $F_3COF$, $CF_2(OF)_2$, $SO_2F_2$, $SOF_2$, $SOF_4$, $NF_3$, $SO_2ClF$, $NOF$, $F_2$ and $SF_4$.

There are several variations of the first embodiment of the process. In one variation, the at least one compound is provided at a first concentration of less than about 10% on a mole basis of the atmosphere. In addition, there are several variants of that variation. In one variant, the first concentration is less than about 6%. In another variant, the first concentration is less than about 1%.

In yet another variant, the atmosphere further comprises at least one member selected from the group consisting of He, Ne, Xe, Kr, $Cl_2$, $N_2$, Ar, CO, $CO_2$, $SO_2$, $O_2$ and air. In a variant of that variant, the at least one member is provided at a second concentration of about 30% to about 60% on a mole basis. In a variant of that variant, the at least one compound is $SO_2F_2$ provided at the first concentration of less than about 3% on a mole basis.

In another variation of the first embodiment of the process, the gaseous mixture used in the process further comprises an odorant. In yet another variation, at least a portion of the atmosphere is recovered for reuse.

The present invention also includes a process for refining a melt comprising at least one molten nonferrous metal. The process comprises refining the melt with an atmosphere containing an effective amount of at least one compound selected from the group consisting of $ClF_3$, $ClF$, $COF_2$, $F_3COF$, $CF_2(OF)_2$, $SO_2F_2$, $SOF_2$, $SOF_4$, $NF_3$, $SO_2ClF$, $NOF$, $F_2$ and $SF_4$.

DETAILED DESCRIPTION OF THE INVENTION

The invention provides a process for treating primary and secondary nonferrous metals or alloys by refining the metals or alloys with an atmosphere containing an effective amount of at least one compound having no recognized ozone depleting potential and a reduced GWP, preferably selected from the group consisting of $ClF_3$, $ClF$, $COF_2$, $F_3COF$, $CF_2(OF)_2$, $SO_2F_2$, $SOF_2$, $SOF_4$, $NF_3$, $SO_2ClF$, $NOF$, $F_2$ and $SF_4$. The nonferrous metals and their alloys thus treated include but are not limited to: aluminum, magnesium, zinc, nickel, copper, and lead. The invention also provides an improved method of processing nonferrous metals and alloys using a refining gas having a reduced GWP (relative to the prior art) by refining the nonferrous metal or alloy with a gaseous mixture including at least one compound having a reduced GWP, preferably selected from the group consisting of $ClF_3$, $ClF$, $COF_2$, $F_3COF$, $CF_2(OF)_2$, $SO_2F_2$, $SOF_2$, $SOF_4$, $NF_3$, $SO_2ClF$, $NOF$, $F_2$ and $SF_4$.

Persons skilled in the art will recognize that the gases of the present invention may be brought in contact by various means with the metals or alloys to be treated or processed in order to remove unwanted impurities therefrom. For example, the gases may be blanketed across the surface of a melt. Alternatively, the gases may be introduced into a melt in various ways, such as by bubbling or by sparging through a lance, a rod or a porous medium, or by a dispenser comprising a rotating shaft and an agitator blade or impeller.

Another possibility is to heat an ingot of the metal or alloy containing impurities in the presence of one or more gases of the present invention. The unwanted impurities will preferentially react with the gas and migrate to the surface.

Persons skilled in the art will recognize that the gases of the present invention may be brought in contact by various means with the metals or alloys (particularly aluminum alloys) to be treated or processed in order to react with elements within the alloys to form refining compounds.

The gases used in the present invention have lower GWP's and/or are less toxic than the gases used in the prior art. Since the gases used in the present invention are more reactive than $SF_6$, these gases can be used at concentrations supplying an equivalent or lower fluorine level. In other words, if $SF_6$ can be beneficially used at a concentration of 1%, then $SO_2F_2$ will have a similar utility at concentrations of approximately 3%.

In a preferred embodiment, the selected compound is provided at a concentration of less than about 10% (on a mole basis) of said gaseous mixture. It is more preferable that the concentration be less than about 6%, and it is even more preferable that it be less than about 1%.

However, since $F_2$, $ClF$, $ClF_3$, $F_3COF$, and $CF_2(OF)_2$ are much more reactive than the other gases used in the present invention, these more reactive gases should only be used at lower concentrations, i.e., at a concentration less than about 5% and preferably less than 1%. If used at higher concentrations (e.g., 10%) in connection with a molten metal like magnesium, these more reactive gases may ignite and cause a metal/fluorine fire. Also, as shown in Table 1 below, these more reactive gases are very toxic, and also will react relatively indiscriminately with any surfaces exposed to them, such as iron/steel structures used in melt processes (e.g., melt pots, furnaces, etc.). This could result in relatively thick metal fluoride layers that may increase the risk of "thermite" type reactions, generation of HF upon exposure to atmospheric moisture, and HF burns to operators due to accidental contact.

In a preferred embodiment, the gaseous mixture further comprises at least one member selected from the group consisting of He, Ne, Xe, Kr, $Cl_2$, $N_2$, Ar, CO, $CO_2$, $SO_2$, $O_2$, and air as a diluent. The use of CO is less desirable because of the flammability and toxicity of CO; but in application to aluminum alloys, CO is more resistant to decomposition and the formation of undesirable aluminum oxides than is $CO_2$. The use of $SO_2$ is less desirable because of potential corrosion problems associated with $SO_2$. In addition, $F_2$ is reactive with CO and violently reactive with $SO_2$, which would make it extremely dangerous to use either gas as a diluent if $F_2$ or another extremely reactive fluorinating agent is present above trace levels.

In addition to significant concentrations of $CO_2$, some nonferrous metals also could benefit from the addition of chlorine or chlorine-containing species (such as $SO_2$ ClF) to the refining gas mixture.

For example, in one embodiment, $CO_2$ is the diluent in the refining atmosphere at a concentration of about 30% to about 60% on a mole basis, and $SO_2F_2$ is provided at a concentration of less than about 3% on a mole basis.

In a preferred embodiment, an odorant is added for safety purposes to the mixture used for the refining atmosphere. This is especially preferred for odorless gases, such as $SO_2F_2$. In contrast, since $F_2$, $COF_2$, $SOF_2$ and $SF_4$ have distinctive odors, the addition of an odorant is less important when these gases are used. The same is true when $SO_2$ is used as a diluent because of the odor of $SO_2$.

Table 1 compares the preferred gases used in the present invention to various gases used in the prior art with regard to GWP and other characteristics.

TABLE 1

| Name | Formula | CAS No.[1] | OSHA PEL/ Ceiling/ Max Peak[2] | ACGIH TWA/ STEL[3] | $GWP_{100}$[4] | Atmospheric Lifetime years | Odor (detection limit in ppm) |
|---|---|---|---|---|---|---|---|
| Sulfur Hexafluoride | $SF_6$ | 2551-62-4 | 1,000/x/x | 1,000/ 1,250 | 24,900 | 3,200 | Odorless |
| Sulfur Dioxide | $SO_2$ | 7446-09-5 | 2/5/x | 10/15 | $-1$[5] | NK[6] | Irritating Acid[3–5] |
| Carbon Dioxide | $CO_2$ | 124-38-9 | 5,000/ 30,000 | asphyxiant | 1 | 50–200 | Odorless |
| Perfluoromethane | $CF_4$ | 75-73-0 | X | asphyxiant | 6,500 | 50,000 | Odorless |
| Perfluoroethane | $C_2F_6$ | 76-16-4 | X | asphyxiant | 9,200 to 12,500 | 10,000 | Odorless |
| Perfluoropropane | $C_3F_8$ | 76-19-7 | X | asphyxiant | 6,950 | 7,000 | Odorless |
| Sulfuryl Fluoride | $SO_2F_2$ | 2699-79-8 | 5/10/x | toxic | ~1 | NK | Odorless |
| Thionyl Fluoride Sulfinyl Fluoride | $SOF_2$ | 7783-84-8 | X | toxic | ~1 | NK | Suffocating |

TABLE 1-continued

| Name | Formula | CAS No.[1] | OSHA PEL/ Ceiling/ Max Peak[2] | ACGIH TWA/ STEL[3] | $GWP_{100}$[4] | Atmospheric Lifetime years | Odor (detection limit in ppm) |
|---|---|---|---|---|---|---|---|
| Sulfur Oxifluoride | $SOF_4$ | 13709-54-1 | X | toxic | ~1 | NK | NK |
| Sulfur Tetraflouride | $SF_4$ | 7783-60-0 | x/0.1/x | 0.1/0.3 | ~1 | NK | Like $SO_2$ |
| Nitrogen Triflouride | $NF_3$ | 7783-54-2 | 10/x/x | 10/15 | 8,000 to 9,720 | 180 to 740 | Moldy |
| Nitrosyl Fluoride | NOF | 7789-25-5 | X | toxic | ~1 | NK | NK |
| Sulfuryl Chloride Fluoride | $SO_2ClF$ | 13637-84-8 | X | toxic | ~1 | NK | NK |
| Trifluoromethyl Hypofluoride | $CF_3OF$ | 373-91-1 | X | toxic | ~1 | 50–200 | Sharp HF Irritating |
| Hypofluorous acid Difluoromethylene ester | $CF_2(OF)_2$ | 16282-67-0 | X | toxic | ~1 | 50–200 | Sharp HF Irritating |
| Carbonyl Fluoride | $COF_2$ | 353-50-4 | 2/5 | 2/5 | ~1 | 50–200 | Sharp HF Irritating |
| Fluorine | $F_2$ | 7782-41-4 | 0.1 | 1/2 | ~0 | <1 hydrolizes | Sharp Pungent Irritating |
| Chlorine | $Cl_2$ | 7782-50-5 | 0.5/1.0 | 1/3 | ~0 | <1 hydrolizes | Disagreeable Suffocating |
| Chlorine Fluoride | ClF | 7790-91-2 | 0.5/1.0 | 1/3 | ~0 | <1 hydrolizes | Disagreeable Suffocating |
| Chlorine Trifluoride | $ClF_3$ | 7790-91-2 | /0.1 | /0.1 | ~0 | <1 hydolizes | Sweet Suffocating |

[1] "CAS" is Chemical Abstract Services.
[2] "OSHA" is Occupational Safety and Health Administration; and "PEL" is Permissible Exposure Limit in parts per million (ppm), 29 CFR 1910.1000.
[3] "ACGIH" is American Conference of Governmental Industrial Hygienists; "TWA" is Time Weighted Average in parts per million (ppm); and "STEL"is Short Term Exposure Limit in parts per million (ppm).
[4] "$GWP_{100}$" is Global Warming Potential relative to that of $CO_2$ estimated over 100 years; for example, the $GWP_{100}$ of $SF_6$ is 24,900 times the $GWP_{100}$ of $CO_2$. Applicants are not aware of any published data regarding the GWP's for the compounds for which the $GWP_{100}$ is indicated to be ~1.
[5] Atmospheric reactions of $SO_2$ produce sulfate aerosols. These aerosols result in negative radiative forcing, i.e. tend to cool the earth's surface, but also are a major source of acid rain.
[6] "not known (NK)"; the atmospheric lifetime of these species are not known to the applicants, but are believed to be comparable to that of $CO_2$.

The comparison of $GWP_{100}$ shows that twelve of the thirteen preferred gases used in the present invention ($ClF_3$, ClF, $COF_2$, $F_3COF$, $CF_2(OF)_2$, $SO_2F_2$, $NF_3$, $SO_2ClF$, $SF_4$, $SOF_2$ NOF, $F_2$ and $SOF_4$) have significantly lower $GWP_{100}$'s than the gases used in the prior art. (Of the thirteen gases, only $NF_3$ has a $GWP_{100}$ greater than ~1; but the $GWP_{100}$ of $NF_3$ is still several fold lower than the $GWP_{100}$ of $SF_6$, and the atmospheric life of $NF_3$ also is shorter than that of $SF_6$.) Furthermore, the prior art did not teach or even appreciate the possible use of these gases for refining.

The gases used in the present invention may be recovered and recycled for reuse. Recovery technologies that may be used include the use of membranes, absorption, condensing, and other means to concentrate the desirable gases for reuse.

While the present invention has been described in detail with reference to certain specific embodiments, the invention is nevertheless not intended to be limited to the details described. Rather, it will be apparent to persons skilled in the art that various changes and modifications can be made in the details within the scope and range of the claims and without departing from the spirit of the invention and the scope of the claims.

What is claimed is:

1. In a method for processing a nonferrous metal and alloys of said metal using a refining gas having a global warming potential, the improvement comprising reducing said global warming potential of said refining gas by refining said nonferrous metal and alloys with a gaseous mixture including at least one compound selected from the group consisting of $SO_2F_2$, $SOF_2$, and $SF_4$, and wherein said gaseous mixture is free of $SF_6$.

2. A method as in claim 1, wherein said at least one compound is provided at a first concentration of from about 0.1% to about 10% on a mole basis.

3. A method as in claim 1, wherein said gaseous mixture further comprises at least one member selected from the group consisting of He, Ne, Xe, Kr, $Cl_2$, $N_2$, Ar, CO, $CO_2$, $SO_2$, $O_2$, and air.

4. A method as in claim 1, wherein said gaseous mixture further comprises an odorant.

5. A process for treating a nonferrous metal and alloys of said metal comprising refining said nonferrous metal and alloys with an atmosphere including at least one compound selected from the group consisting of $SO_2F_2$, $SOF_2$, and $SF_4$, wherein said atmosphere is free of $SF_6$, and wherein said compound is present to refine at least one impurity.

6. A process as in claim 5, wherein said effective amount is from about 0.1% to about 10% on a mole basis of said atmosphere.

7. In a method for processing a melt comprising at least one molten nonferrous metal using a refining gas having a global warming potential, the improvement comprising reducing said global warming potential of said refining gas by refining said melt with a gaseous mixture including at least one compound selected from the group consisting of $SO_2F_2$, $SOF_2$, and $SF_4$, and wherein said gaseous mixture is free of $SF_6$.

8. A process for refining a melt comprising at least one molten nonferrous metal, said process comprising refining said melt with an atmosphere containing at least one compound selected from the group consisting of $SO_2F_2$, $SOF_2$, and $SF_4$, and wherein said atmosphere is free of $SF_6$.

9. A method for removing impurities from an ingot of a nonferrous metal and alloys of said metal, comprising heating said ingot in a presence of an atmosphere containing at least one compound selected from the group consisting of $SO_2F_2$, $SOF_2$, and $SF_4$, and wherein said atmosphere is free of $SF_6$.

10. A method for removing impurities from an ingot of a nonferrous metal and alloys of said metal, comprising heating said ingot in a presence of an atmosphere containing at least one compound selected from the group consisting of $ClF_3$, $ClF$, $COF_2$, $F_3COF$, $CF_2(OF)_2$, $SO_2F_2$, $NF_3$, $SO_2ClF$, $SOF_2$, $SOF_4$, $NOF$, and $SF_4$.

* * * * *